March 25, 1969     W. D. JEWELL ET AL     3,434,352
ACCELEROMETERS
Filed May 1, 1961
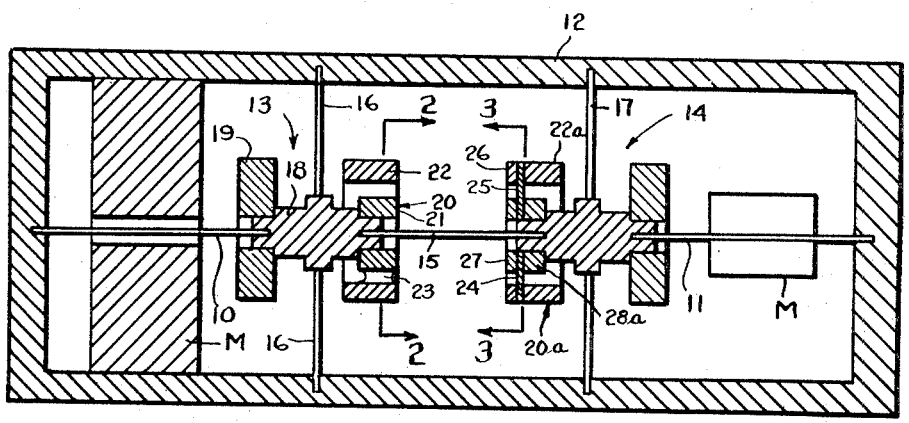
Fig. 1.
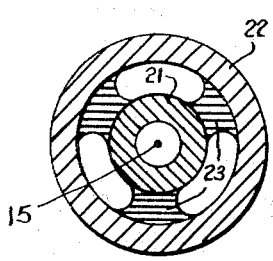    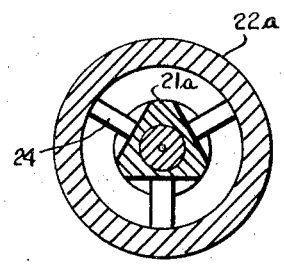    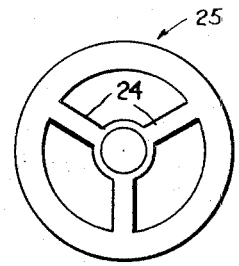
Fig. 2.     Fig. 3.     Fig. 4.
WENDELL D. JEWELL
LLOYD A. NEVALA
FREDERICK KORN
            *INVENTORS.*
BY *Raymond A. Paquin*
            *ATTORNEY.*

3,434,352
ACCELEROMETERS
Wendell D. Jewell, West Hempstead, Lloyd A. Nevala, Lake Ronkonkoma, and Frederick Korn, Woodbury, N.Y., assignors to American Bosch Arma Corporation, a corporation of New York
Filed May 1, 1961, Ser. No. 107,285
Int. Cl. G01p 15/08
U.S. Cl. 73—517  2 Claims The present invention relates to accelerometers and has particular reference to proof masses therefor.

In vibrating string accelerometers a mass is suspended by two axially aligned elements or strings maintained in vibration at their resonant frequencies. Acceleration causes an increase of the natural frequency of one element and a decrease of the other element, the resulting difference frequency being a measure of the acceleration. Such accelerometers are typified by the one described in copending U.S. patent application S.N. 586,615 filed May 22, 1956 for "Accelerometer" and now Patent No. 3,332,290, and assigned to the assignee of this application.

The accelerometer mass, being elastically supported by the vibrating strings and cross supports has various modes of natural vibration, the most troublesome of which has been found to be the longitudinal mode, i.e., motion in line with the sensitive axis. Whenever the accelerometer as a whole is vibrated along its axis at the particularly troublesome or resonant, frequency the proof mass is excited into vibration with consequent amplified alternating changes in string tension. Due to the inherent non-linearities in the output characteristic, large errors in string difference frequency result. In the worst case, if the input vibration is sufficiently high the sensitive strings may be broken. A mechanical damper is added to the proof mass to reduce the amplitude of vibration of the mass, and to quickly extinguish the vibrations when the excitation is ceased.

The mechanical damper comprises a damping ring attached to the body of the proof mass by mechanically flexible spokes which include some energy absorbent material such as a plastic epoxy for example.

For a more complete understanding of this invention, reference may be had to the accompanying diagrams, in which FIG. 1 illustrates the vibrating string accelerometer,
FIG. 2 is a cross section through line 2—2 of FIG. 1,
FIG. 3 is a cross section through line 3—3 of FIG. 1, and
FIG. 4 is a detail of the construction shown in FIG. 3.

With reference now to FIG. 1, the fundamentals of the vibrating string accelerometer's mechanical construction as shown. Here a pair of strings 10, 11 are attached to a frame 12 and to weights 13 and 14 respectively. The strings are kept under tension by an elastic member 15 connected between the weights 13, 14. The weights 13 and 14 are also supported in the frame 12 by cross supports 16, 17 respectively disposed around the weights to prevent lateral displacement of the weights in any direction. In operation, the strings 10, 11 are forced into vibration at their natural frequency by electronic oscillator means (not shown) which supply electrical power to the strings 10, 11 to produce the oscillations. The oscillator frequencies are controlled by the connected strings 10, 11 which are the effective tank circuits of the oscillators. If the strings are metallic, magnets M, M are employed to supply the magnetic fields required for producing motive action in the wires, and for inducing electrical voltages across the wires to sustain vibration. If the strings are piezoelectric the magnets are not required since the motive action is obtained directly from stresses induced by the applied electrical fields, and the reactive characteristics of the tape are employed to maintain oscillation.

Under acceleration, forces applied by weights 13, 14 change the tension on the strings 10, 11 in opposite directions and change the natural frequencies of vibrations. The difference between these natural frequencies is used as a measure of acceleration. All of the foregoing is now well known in the art and further reference may be had to the copending application previously referred to for additional information, and to co-pending application S. N. 821,570 filed June 19, 1959, now Patent No. 2,984,111, which discusses the piezoelectric accelerometer.

One difficulty encountered in manufacture arises from the fact that the elastic structure has a resonant frequency within the expected operating environment. The accelerometer tends to give erroneous indications or it may be severely damaged unless this characteristic is corrected. It has been found that if the weights 13, 14 are so constructed as to include a vibration absorption device as part of its mass, a considerable improvement is obtained. Thus, in FIG. 1, the weight 13 is actually a composite construction including a hub 18 having a solid ring 19 on one end and a compound ring 20 attached to the opposite end. The compound ring 20 is built-up of an inner ring 21 and an outer ring 22 joined together by some type of spring and damping material 23. In the embodiment illustrated by weight 13 the function of the spring and damping material are assumed by an elastomer of epoxy resin which is bonded to both the inner and outer rings 21, 22 in three or more equally spaced blobs or spokes, for example, as seen more clearly in FIG. 2.

It is possible that under sustained acceleration the epoxy may assume a "set," or flow so as to create an undesirable permanent shift of the position of ring 22 with respect to ring 21. This effect is obviated in the modification shown on weight 14 and FIG. 3, wherein the springs comprise metallic spokes 24 attached to both the inner and outer rings 21a, 22a and in which the spokes 24 are coated with an epoxy for damping. The inner ring 21a, as seen in FIG. 3, has been cut away at three equally displaced positions in order to accommodate a longer length of spring between the inner and outer rings. The spokes 24 may be fashioned, for example, by photo etching a spider 25 such as that shown in FIG. 4 and attaching the outer annular portion to outer ring 22a and attaching the inner annular portion to inner ring 21a. Clamping means for this purpose may include clamping rings 26, 27, FIG. 1, which assist in defining the bending edges of the spokes 24. It is conceivable that the compound ring 20a may be machined entirely from a single piece of metal, but the built-up structure permits wider choice of materials and easier control of dimensions.

The epoxy is selected from a large number of available materials, and the area required to achieve optimum damping of the proof mass is determined from the physical characteristics such as mechanical hystereses for example, of the selected epoxy. The spokes (either metal or epoxy) must be designed to have a stiffness such that the mass does not resonate at the natural frequency of the strings, however. It should be understood that the complete weight structure is dimensioned in a manner such that the system is tuned to be mechanically resonant at the frequency at which the disturbing vibrations are to be damped out.

The term "epoxy" has been used here to emphasize the use of newly discovered materials in the plastic art. However, it should be recognized that other elastomers, perhaps less suitable, such as rubber can be substituted for the epoxy. However, the epoxys have many advantages such as stability and strength which would not be found in some of the earlier materials.

It will be seen that in the preferred construction of

FIG. 1, the inertia rings 22 are located on that end of the proof mass which is opposite the end to which the sensitive string 10 or 11 is attached.

We claim:

1. Vibrating-string accelerometer apparatus, comprising:
    a frame;
    a mass member;
    a vibrating-string member;
    means mounting said mass member and said vibrating-string member from said frame and to each other for producing different stressing of said vibrating-string member by said mass member for different accelerations of said frame;
    said mass member comprising a first element connected to said vibrating-string member, a damping element concentric with said first element, and elastic vibration-absorptive means connecting said first element to said damping element for permitting vibratory motion of said damping element with respect to said first element and for absorbing energy of mechanical vibrations produced therein by undesired oscillations of said mass member; and
    additional means connecting said first element to said frame for constraining motion of said mass with respect to said frame, said damping element being spaced from said additional means and free to vibrate without constraint by said frame.

2. Vibrating-string accelerometer apparatus, comprising:
    a frame;
    a mass member;
    a vibrating-string member; and
    means mounting said mass member and said vibrating-string member from said frame and to each other for producing different stressing of said vibrating-string member by said mass member for different accelerations of said frame;
    said mass member comprising a first element connected to said vibrating-string member, a damping element concentric with said first element, and elastic vibration-absorptive means connecting said first element to said damping element for permitting vibratory motion of said damping element with respect to said first element and for absorbing energy of mechanical vibrations produced therein by undesired oscillations of said mass member;
    said damping element being vibrative with respect to said first element at a frequency differing from the natural vibration frequency of said vibrating-string member and substantially equal to the natural resonant frequency of said mass member with respect to said frame.

References Cited

UNITED STATES PATENTS

| 2,881,276 | 4/1959 | Mintz et al. | 102—70.2 X |
| 3,010,325 | 11/1961 | Harkness | 73—517 |

FOREIGN PATENTS

| 861,325 | 2/1961 | Great Britain. |

VERLIN R. PENDEGRASS, *Primary Examiner.*